United States Patent
Ramakrishnan et al.

(10) Patent No.: US 9,794,378 B2
(45) Date of Patent: Oct. 17, 2017

(54) NETWORK TRAFFIC CONTROLLER (NTC)

(75) Inventors: Hariramanathan Ramakrishnan, Flushing, NY (US); Bryan A. Whitehead, East Northport, NY (US); Maksim A. Azarov, Moscow (RU); Neil A. Winchester, Dix Hills, NY (US); William R. Chiechi, Port Jefferson, NY (US)

(73) Assignee: STANDARD MICROSYSTEMS CORPORATION, Hauppauge, NY (US)

( * ) Notice: Subject to any disclaimer, the term of this patent is extended or adjusted under 35 U.S.C. 154(b) by 1448 days.

(21) Appl. No.: 11/928,647

(22) Filed: Oct. 30, 2007

(65) Prior Publication Data

US 2008/0109562 A1     May 8, 2008

Related U.S. Application Data

(60) Provisional application No. 60/864,921, filed on Nov. 8, 2006.

(51) Int. Cl.
    *H04L 29/06*     (2006.01)
    *H04L 29/12*     (2006.01)
    *H04L 12/861*     (2013.01)

(52) U.S. Cl.
    CPC ............ *H04L 69/18* (2013.01); *H04L 29/06* (2013.01); *H04L 29/12009* (2013.01);
(Continued)

(58) Field of Classification Search
    CPC ....... G06F 17/30; H04L 49/90; H04L 49/901; H04L 69/16; H04L 69/161; H04L 69/167; H04L 69/18; H04L 29/12009; H04L 29/06
(Continued)

(56) References Cited

U.S. PATENT DOCUMENTS 5,436,618 A     7/1995     Van Steenbrugge
6,101,616 A     8/2000     Joubert et al.
(Continued)

FOREIGN PATENT DOCUMENTS

EP     1538803     6/2005
WO     0148606     7/2001
(Continued)

OTHER PUBLICATIONS

International search report for application No. PCT/US2007/084152, mailed Jun. 17, 2008.
(Continued)

*Primary Examiner* — Ramy M Osman
(74) *Attorney, Agent, or Firm* — Slayden Grubert Beard PLLC

(57) ABSTRACT

A Network Device (ND) may be configured to enable secure digital video streaming for HD (high definition) digital video systems over a standard network. The ND may operate in at least one of two modes, a co-processor mode and a stand-alone mode, and may provide at least three high level functions: network interface control (NIC), video streaming offload (VSO), and stand-alone video streaming (SVS). To seamlessly execute the VSO functionality, the ND may be configured to have two network stacks running synchronously on a single network interface having a single network address. The two network stacks may share the data traffic, while the Host network stack may act as a master, and configure the ND network stack to accept only specifically designated traffic, thus offloading some of the data processing to the processor configured in the ND. The ND network system may appear as an ordinary network controller to the Host, from which the user may configure the ND network driver to obtain/set the network address, configure the physical layer link speed and duplex mode, configure the multi-
(Continued)

cast filter settings, and obtain and clear the network level statistics.

16 Claims, 5 Drawing Sheets

(52) U.S. Cl.
CPC .............. *H04L 49/90* (2013.01); *H04L 69/16* (2013.01); *H04L 69/161* (2013.01); *H04L 69/167* (2013.01)

(58) Field of Classification Search
USPC .......................................................... 709/250
See application file for complete search history.

(56) References Cited

U.S. PATENT DOCUMENTS

| | | | |
|---|---|---|---|
| 6,208,649 B1 * | 3/2001 | Kloth | H04L 49/201 370/392 |
| 6,393,489 B1 * | 5/2002 | Sambamurthy | H04L 29/06 370/463 |
| 6,434,620 B1 | 8/2002 | Boucher et al. | |
| 6,526,440 B1 * | 2/2003 | Bharat | G06F 17/30864 707/999.003 |
| 6,681,258 B1 * | 1/2004 | Ratcliff | H04L 29/12009 709/230 |
| 6,938,092 B2 | 8/2005 | Burns | |
| 6,965,941 B2 | 11/2005 | Boucher et al. | |
| 7,069,312 B2 | 6/2006 | Kostic et al. | |
| 7,124,293 B2 | 10/2006 | Mualem et al. | |
| 7,167,926 B1 | 1/2007 | Boucher et al. | |
| 7,174,393 B2 | 2/2007 | Boucher et al. | |
| 7,224,692 B2 | 5/2007 | Fan | |
| 7,254,637 B2 | 8/2007 | Pinkerton et al. | |
| 7,274,706 B1 * | 9/2007 | Nguyen | H04L 12/56 370/419 |
| 7,275,152 B2 | 9/2007 | Goud et al. | |
| 7,697,434 B1 * | 4/2010 | Tripathi | G06F 13/387 370/230 |
| 2002/0087732 A1 | 7/2002 | Boucher et al. | |
| 2002/0178268 A1 * | 11/2002 | Aiken, Jr. | H04L 29/06 709/228 |
| 2003/0002854 A1 * | 1/2003 | Belknap | G11B 27/005 386/344 |
| 2003/0140124 A1 | 7/2003 | Burns | |
| 2003/0204634 A1 | 10/2003 | Pinkerton et al. | |
| 2004/0003126 A1 | 1/2004 | Boucher et al. | |
| 2004/0042412 A1 | 3/2004 | Fan | |
| 2004/0042464 A1 | 3/2004 | Elzur et al. | |
| 2004/0042483 A1 | 3/2004 | Elzur et al. | |
| 2004/0054813 A1 | 3/2004 | Boucher et al. | |
| 2004/0057441 A1 * | 3/2004 | Li | H04L 29/06 370/401 |
| 2004/0062245 A1 | 4/2004 | Sharp et al. | |
| 2004/0073716 A1 | 4/2004 | Boom et al. | |
| 2004/0078683 A1 * | 4/2004 | Buia | H04L 12/66 714/37 |
| 2004/0125751 A1 | 7/2004 | Vangal et al. | |
| 2004/0156393 A1 | 8/2004 | Gupta et al. | |
| 2004/0257986 A1 | 12/2004 | Jha et al. | |
| 2005/0021680 A1 | 1/2005 | Ekis et al. | |
| 2005/0100023 A1 * | 5/2005 | Buckwalter | 370/395.52 |
| 2005/0108315 A1 * | 5/2005 | Singh | H04L 29/06 709/200 |
| 2005/0122986 A1 | 6/2005 | Starr et al. | |
| 2005/0180445 A1 * | 8/2005 | Cheng | H04L 47/10 370/415 |
| 2005/0188074 A1 | 8/2005 | Voruganti et al. | |
| 2005/0190787 A1 | 9/2005 | Kuik et al. | |
| 2005/0195833 A1 | 9/2005 | Chiang et al. | |
| 2005/0226238 A1 | 10/2005 | Hoskote et al. | |
| 2005/0266926 A1 * | 12/2005 | Kesselman | G06F 9/466 463/42 |
| 2006/0010253 A1 * | 1/2006 | Aiken | H04L 29/06 709/250 |
| 2006/0015618 A1 | 1/2006 | Freimuth et al. | |
| 2006/0015651 A1 | 1/2006 | Freimuth et al. | |
| 2006/0031524 A1 | 2/2006 | Freimuth et al. | |
| 2006/0069792 A1 | 3/2006 | Pinkerton et al. | |
| 2006/0168281 A1 | 7/2006 | Starr et al. | |
| 2006/0239242 A1 * | 10/2006 | Huffschmid | H04L 29/06 370/352 |
| 2007/0011272 A1 | 1/2007 | Bakke et al. | |
| 2007/0014245 A1 | 1/2007 | Aloni et al. | |
| 2007/0014246 A1 | 1/2007 | Aloni et al. | |
| 2007/0030861 A1 | 2/2007 | Johnson et al. | |
| 2007/0033301 A1 | 2/2007 | Aloni et al. | |
| 2007/0047549 A1 | 3/2007 | Park | |
| 2007/0064725 A1 * | 3/2007 | Minami | H04L 12/2602 370/463 |
| 2007/0088874 A1 | 4/2007 | Brabant et al. | |
| 2007/0118665 A1 | 5/2007 | Philbrick et al. | |
| 2007/0127485 A1 | 6/2007 | Kim et al. | |
| 2007/0130356 A1 | 6/2007 | Boucher et al. | |
| 2007/0136495 A1 | 6/2007 | Boucher et al. | |
| 2007/0162639 A1 | 7/2007 | Chu et al. | |
| 2007/0233886 A1 | 10/2007 | Fan | |
| 2007/0255802 A1 | 11/2007 | Aloni et al. | |
| 2007/0255866 A1 | 11/2007 | Aloni et al. | |
| 2008/0056124 A1 | 3/2008 | Nanda et al. | |
| 2008/0095182 A1 | 4/2008 | Elzur et al. | |
| 2008/0117911 A1 | 5/2008 | Rajakarunanayake et al. | |
| 2008/0133798 A1 | 6/2008 | Park et al. | |
| 2008/0151922 A1 | 6/2008 | Elzur et al. | |
| 2008/0165784 A1 | 7/2008 | Ko et al. | |
| 2008/0168190 A1 | 7/2008 | Parthasarathy et al. | |

FOREIGN PATENT DOCUMENTS

| | | |
|---|---|---|
| WO | 02/059757 | 8/2002 |
| WO | 2006103169 | 10/2006 |

OTHER PUBLICATIONS

International Search Report in Taiwanese Application No. 096142269 dated Nov. 11, 2011, 1 page.

* cited by examiner

NETWORK TRAFFIC CONTROLLER (NTC)

PRIORITY CLAIM

This application claims benefit of priority of provisional application Ser. No. 60/864,921 titled "Network Traffic Controller with Multimedia Co-Processor", filed on Nov. 8, 2006, whose inventors are Maksim A. Azarov, Neil A. Winchester, William R. Chiechi, Bryan A. Whitehead, and Hariramanathan Ramakrishnan, and which is hereby incorporated by reference as though fully and completely set forth herein.

BACKGROUND OF THE INVENTION

Field of the Invention

This invention relates generally to computer networking and, more particularly, to the design of a network device.

Description of the Related Art

Personal computers (PCs) have recently joined television sets, high fidelity stereo equipment, and compact disc players as part of the vast array of electronic devices widely used in both the office and the home. The electronics marketplace has also seen a proliferation of appliances and personal electronics devices (consumer electronics devices) that use solid-state memory, in addition to devices that employ other widely used storage mediums. Some of the more popular consumer electronics devices include video cameras, photo cameras, personal digital assistants, portable music devices, as well as set top boxes, high definition (HD) television systems and digital recorders among others. The proliferation of such devices has correspondingly brought with it an emphasis on connectivity and networking for transferring data between the personal electronic devices, personal computers, and/or set top boxes.

In addition to specifications for internal busses, such as the Peripheral Component Interconnect (PCI), various interface standards for connecting computers and external peripherals have also been introduced, each aiming to provide simple connectivity at high speeds. Examples of such standards include the IEEE 1394 standard also referred to as FireWire, and the Universal Serial Bus (USB), both high-speed serial bus protocols. The most widely used networking standard for connecting computers in both Local Area Networks (LANs) and Wide Area Networks (WANs) has been the Ethernet protocol. More specifically, Ethernet is the IEEE 802.3 series standard, originally based on the Carrier Sense Multiple Access with Collision Detection (CSMA/CD) method that provided a means for two or more computer stations to share a common cabling system. CSM/CD has formed the basis for Ethernet systems that reached transfer speeds in the megabit range, that is the Mbit/sec range. Recent switched based and/or router based Ethernet systems are capable of supporting transfer rates in the Gbit/sec range. Ethernet generally makes efficient use of shared resources, is typically easy to reconfigure and maintain, and provides compatibility across many manufacturers and systems, while keeping the cost low.

However, Audio % Video (A/V) consumer entertainment systems such as HD televisions, set-top box and personal video recorders (PVRs) are generally not optimized for distributing/receiving high quality high resolution programming content through a standards based network, such as IEEE 802.3 Ethernet standard, IETF (Internet Engineering Task Force), and/or RFC (Request For Comments) compliant protocols. This typically holds for broadband Ethernet connections as well. One issue that has presented a problem in the development of entertainment systems has been the migration from closed networks—which may include proprietary, special purpose Ethernet Switch fabrics—to an open network, while maintaining performance levels required in the distribution of higher quality/resolution A/V programming content. It has also become increasingly difficult, if at all possible, to obtain the desired performance levels while moving real-time streaming data over a limited bandwidth local bus, utilizing standard Ethernet controllers. In addition, the generally high prices of consumer electronic products featuring Ethernet network components have made it difficult to assemble systems at reasonable costs.

Certain complexities inherent in the transmission of real-time and non-real-time audio/video data do not present a problem when employing data transport models and/or approaches such as digital satellite, cable, and terrestrial and proprietary, special purpose transmission systems. Digital satellite, cable and other proprietary, special purpose transmission systems are typically considered to be "closed networks". Generally, a "closed network" in this context refers to a solution based on specifications not available to the general public. A proprietary solution will typically afford an individual manufacturer or group of manufacturers the time and resources to develop unique solutions that may achieve the desired performance goals, but such solutions will not usually interoperate with competing products. Examples of proprietary, special purpose solutions typically include digital video broadcasting through Cable TV (CATV) Networks, digital video broadcasting over Public Switched Telephone Networks (PSTN) and/or Integrated Services Digital Networks (ISDN), and digital video broadcasting through Satellite Master Antenna TV (SMATV) distribution system networks. A variety of special purpose network standards have been defined for various physical and transport models, and implemented under standards bodies, such as the DVB-ETSI (European Telecommunications Standards Institute), for example. The overall content distribution system is typically controlled by broadband network providers such as Cable Vision, Comcast and Direct TV. A broadband network provider typically dictates the hardware, software and protocols used in such a system.

In contrast, in an "open" network the hardware, software and the corresponding protocols are all defined by well-known standards with solutions readily available from different manufacturers, where such solutions are generally interoperable with each other. Additionally, an open network is a shared network, with potentially numerous service and content providers using the shared network to distribute content. As previously mentioned, one example of an open network is the IETF, which is a large, open community of network designers, operators, vendors, and researchers whose purpose is to coordinate the operation, management and evolution of the Internet, and to resolve short-range and mid-range protocol and architectural issues. Open network protocols are layered, based on the International Standards Organization (ISO) networking model. Any given open network generally has additional overhead depending on the network protocols used while communicating through the open network. Many, if not all current solutions do not have the system resources to support an open network model while processing higher quality and resolution A/V programming content. In addition, resource provisioning is typically more difficult to manage on such open networks.

Because broadband A/V distribution has historically been performed by satellite and cable services utilizing set-top-box (STB) and personal video recording (PVR) devices, the dissemination of A/V content using Ethernet as the primary method of distribution produces additional challenges. Existing A/V solutions generally use Ethernet connectivity at typical data rates of 1 to 6 Mbits per second for activities such as Internet web surfing, and as a return path for video-on-demand (VOD) applications, billing systems, and limited A/V distribution in the home. Bandwidth requirements for streaming higher quality video and/or audio content are substantially higher. For example, to support one High Definition (HD) video stream, a throughput of 12 to 60 Mbits per second with possibly some form of priority bandwidth provisioning, including QOS (Quality of Service), may be required. The need for QOS is usually determined by buffering and latency. For example, increased bandwidth requirements may necessitate an increased QOS in case a time delay between switching video content channels exceeds the average acceptable time elapsed between channel selections made by a user while "channel surfing", due to buffering delays. Distribution of A/V data must preferably remain steady with minimal delays. With existing Ethernet solutions, achieving the required performance levels is typically very difficult if at all possible.

In addition, STBs and other consumer electronics devices are generally very cost sensitive. Most embedded processors and hardware building blocks comprised in the bulk of consumer electronics devices are usually low cost and feature limited performance (typically referenced as millions of instructions per second (MIPS)). Trade-offs between memory access speeds, CPU speed, and power consumption are quite common. For most system designers, migrating to an open network with its additional network processing overhead, when the CPU bandwidth is just enough for the core application, might necessitate migrating to a more expensive system solution. In addition, with this additional network overhead, utilizing a standard Ethernet controller will typically not give the performance needed to enable an open network solution, especially when aiming for low cost consumer electronics products.

The concept of transferring real-time and non real-time video and audio content over a shared and open network has been addressed in a variety of ways. For example, wireless modulation solutions such as 801.11a, b and g have been considered for shared access local area networks. Wired solutions such as 802.3 10/100/1000 Base-T twisted wire pair encoding solutions have also been considered. Numerous solutions have also been described at the media access and transport level. Some of these solutions include methods of media access using Ethernet 802.3, Wireless, 802.11a,b and g and other solutions such as Asynchronous Transfer Mode (ATM), Synchronous Optical Networking (SONET), and others. Additionally, various methods to achieve a higher QOS have been addressed by certain proprietary solutions.

One approach involves the concept of "transmission profiles", where network systems and aggregators select paths by detecting additional information in the network packet, as in an Ethernet packet. In other cases Virtual Local Area Network (VLAN) tags are utilized, or ATM is implemented utilizing (virtual) path identifiers. Some solutions implement data bandwidth allocation, where network systems may be architected such that high-speed access is provided over frequency-division multiplexed (FDM) channels, enabling transmission of Ethernet frames and/or other data across a cable transmission network or other form of FDM transport. Devices would typically allocate downstream and upstream bandwidth on previously defined frequency channels based on time slot assignments for various network packets. In terms of transport, many current solutions utilize the Internet Protocol (IP). In some cases, various connection-oriented protocols such as Transmission Control Protocol (TCP) are employed.

However, most existing systems typically do not offer an open network solution built around standard and widely used network protocols (e.g. the Ethernet protocol) that is capable of maintaining performance levels required in the distribution of higher quality and resolution A/V programming content. For example, current systems utilizing standard Ethernet controllers generally do not allow for movement of real time streaming data over a limited bandwidth local bus, thus failing to achieve desired performance levels.

Other corresponding issues related to the prior art will become apparent to one skilled in the art after comparing such prior art with the present invention as described herein.

SUMMARY OF THE INVENTION

In one set of embodiments, a Network Device (ND) may be configured to enable secure digital video streaming over Ethernet for HD (high definition) digital video systems. The ND may operate in at least one of two modes, a co-processor mode and a stand-alone mode, and may provide at least three high level functions: network interface control (NIC), video streaming offload (VSO), and stand-alone video streaming (SVS). The NIC may comprise standard network access functionality, the VSO may enable Host CPU-controlled offload of high-bandwidth HD video streams in co-processor mode, and the SVS may allow video streaming in stand-alone mode, without intervention by an external Host CPU. Software associated with the ND may be divided into two main categories: controller firmware running on a processing unit configured on the ND, and Host software intended for the Host processor (CPU). The ND may also be configured with extensive master DMA (direct memory access) capabilities to reduce CPU involvement in memory transactions.

In one embodiment, basic Layer-2 Ethernet NIC access may be provided by the ND network driver, which may be configured to use a conventional NIC interface, while extended functions of the ND may be accessed via a designated ND application programming interface (NAPI). In order to seamlessly execute the VSO functionality, the ND may be configured to have two TCP/IP stacks running synchronously on a single Ethernet interface. The Two TCP/IP stacks may share the data traffic, while the Host TCP/IP stack may act as a master, and configure the ND TCP/IP stack to accept only specifically designated traffic, thus offloading some of the data processing to the processor configured in the ND. The ND Ethernet system may appear as an ordinary network controller to the Host, from which the user may configure the ND Ethernet driver to obtain/set the MAC address, configure the physical layer link speed and duplex mode, configure the multicast filter settings, and obtain and clear the Ethernet level statistics.

The ND may also operate in a pass-through mode to allow all the Ethernet packets to reach the Host without any of the packets being intercepted and/or routed to the processor configured in the ND, when the Host needs to receive all the Ethernet frames. In pass-through mode, the ND may thus send the Ethernet frames directly to the Host without any IP level processing, which may be useful, for example, when the Host doesn't have an IP address, or wants to use a Boot-up protocol.

In many present day commercial systems, TCP (Transmission Control Protocol) offload engines, or specifically media offloading, may be implemented with a single processor not having a TCP/IP stack but acting as a master and offloading the media traffic to another processor that has a full function TCP/IP stack. Yet other systems may include an offload co-processor acting as a complete network termination point that removes the protocol headers and passes just the data to the Host processor. One of the main disadvantages of such solutions is that the Host processor may not be operating to fully utilize the rich features of the operating system. The performance penalty is usually high when traffic to the Host increases. In contrast, the ND may be configured to use a feature or features of an existing operating system structure, e.g. a Linux firewall architecture to tunnel traffic to the Host, thereby rendering the performance penalty negligible, without compromising the flexibility of the Host to utilize the rich features of the operating system, and dynamically determine what portion of the traffic to offload to the processor configured in the ND.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
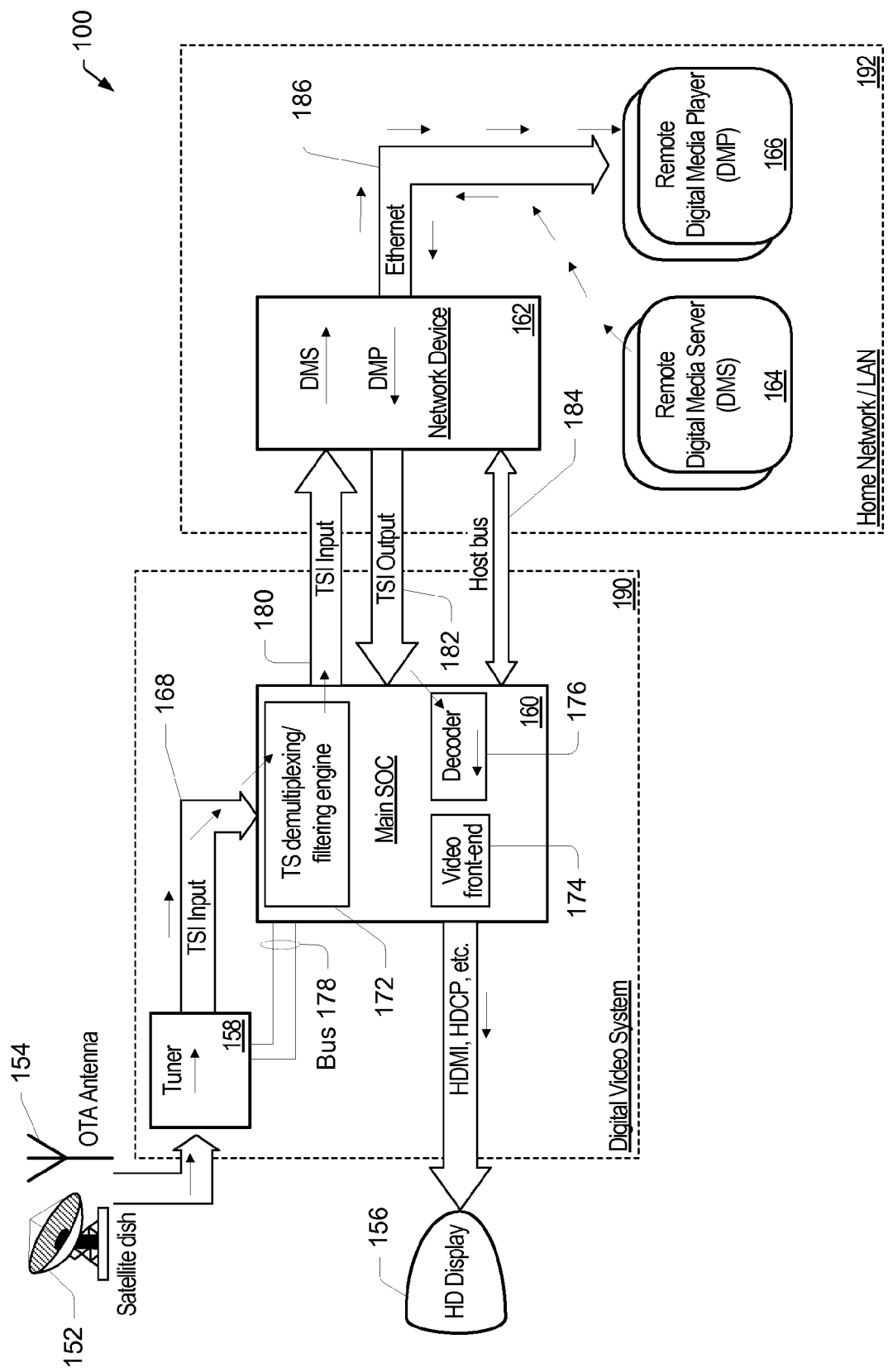
FIG. 1 shows the block diagram of a video/audio system configured with a network device (ND) operating in co-processor mode to offload streaming from a Host CPU, according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, 'DWORD', or "Double Word" is used to reference a 32-bit size data word. "Local system memory" or "local memory" refers to a memory comprised in a Host system and typically embedded in or directly interfacing with a central processing unit and/or central controller. "Remote system memory" or "remote memory" refers to a memory comprised in the Host system but not embedded in or directly interfacing with the central processing unit and/or central controller, or a memory comprised in a remote system distinct from the Host system. When comprised in the Host system, a remote memory may represent memory embedded in a peripheral device and/or additional memory not directly interfacing to the Host system's dedicated memory bus.

As also used herein, and as applied to a system, "real-time", "real-time delivery", "real-time operation" and/or "real-time streaming" indicates that an input signal (or set of input signals) to the system and/or any corresponding output signal (or output signals) can be processed (or generated) continuously by the system in the time it takes the system to input and/or output the same set of signals, independent of the processing delay incurred in the system. In other words, the input signals and corresponding output signals are being processed and output respectively, by the system at a rate commensurate, on average, with the rate at which the input signals are being received by the system. When the word "port" is used in the context of software, e.g. application software and driver software, and/or in the context of an operating system, it is meant to refer to an endpoint to a logical connection in a network system, for example in TCP/IP and UDP networks. In one set of embodiments, a "port number" may be used to identify what type of port is being referenced. For example, in TCP/IP and/or UDP networks, port number 80 is used for HTTP traffic. In another set of embodiments, a "port" may also represent a combination of encapsulation header field values from which a single interface match may be obtained.

Also, as used herein, "transport stream interface" (TSI) is used in a general sense to reference a dedicated interface configured for the transmission of data packet streams that have been derived from elementary streams, service information, private data, and/or conditional access control among others. The data packet streams, which may include video and audio streams, may also be multiplexed together and converted into "transport packets" for transmission over the "transport stream interface".

Many present day systems feature a network connection and/or interface (e.g. IP interface or Ethernet interface) that are not optimized. For example, when certain types of data, such as streaming data (which may comprise real-time video and/or audio data) are transmitted over a standard network connection (e.g. an Ethernet connection), in order for the streaming data to reach its intended destination (e.g. a rendering device such as a television display or audio player), it may first need to be transferred to the Host CPU, in most cases over a local bus and/or over a memory bus or I/O bus. In addition to the Host CPU's possibly having to format and copy the streaming data, there may likely also be contention for bandwidth with other devices coupled to the same bus. However, the required processing by the Host CPU may be pre-empted by offloading the streaming data to a co-processor, and/or transmitting the streaming data to the Host CPU or a target destination over a dedicated interface (e.g. transport stream interface) to relieve the Host CPU from having to perform additional processing and/or formatting on the transmitted streaming data. Furthermore, it would be advantageous to maintain network connectivity for the Host CPU while processing and/or transmitting/receiving offloaded data over the dedicated interface, to enable the Host CPU to fully utilize the rich features of the operating system.

In one set of embodiments, a Network Device (ND) may be configured to enable secure digital video streaming over Ethernet for audio/video systems, e.g. HD (high definition) digital video systems. The ND may operate in at least one of two modes, a co-processor mode, illustrated in FIG. 1, and a stand-alone mode, illustrated in FIG. 2. The ND may provide at least three high level functions: network interface control (NIC), video streaming offload (VSO), and stand-alone video streaming (SVS). The NIC may comprise standard network access functionality, the VSO may enable Host CPU-controlled offload of high-bandwidth HD video streams in co-processor mode, and the SVS may allow video streaming in stand-alone mode, without intervention by a Host processing unit (hereinafter referred to as Host CPU) external to the ND. Software associated with the ND may be divided into two major categories: controller firmware running on a processing unit configured in the ND, (hereinafter generally referred to as ND CPU), and Host software intended for the Host CPU. The ND may also be configured with extensive master DMA (direct memory access) capabilities, as illustrated in FIG. 3, to reduce CPU processing operations during memory transactions.

FIG. 1 shows one embodiment in which an ND 162 may be configured to operate in co-processor mode as a component of a Host System (HS) 100 that may include a home network/LAN (local area network) 192, and Digital Video System (DV) 190. DV 190 may be one of a variety of DV systems already in existence or a newly designed system, configured to receive audio/video signals, which may comprise high-definition audio/video signals, via satellite 152 and/or antenna 154, and generating transport streams (TS) from the received signals via tuner 158. The TS may be provided to SOC 160 demultiplexing/filtering through TSI input 168, and via TS demultiplexing/filtering engine 172. The filtered TS may be provided to Home Network/LAN 192 via TSI port 180, where ND 162, acting as a Digital Media Server (DMS), may provide the filtered TS to remote Digital Media Player (DMP) 166. Optionally, any video portion(s) of the filtered TS may be displayed on HD display 156 through Video front-end circuit 174. Tuner 158 may be controlled/configured by SOC 160 via bus 178, which may be an I²C bus, for example. SOC 160 and ND 162 may both be coupled to Host bus 184 for configuration and user access.

In one set of embodiments, ND 162 may provide Host system 100 with HTTP (hypertext transfer protocol) streaming offload, freeing main SOC (system on chip) 160 to handle other responsibilities. In some embodiments, HTTP streaming may be offloaded to ND 162 using two sample applications running on SOC 160. Thus, in co-processor mode, ND 162 may be operating as a companion chip to SOC 160. While the SOC 160 may perform all the tasks characteristic of DV 190—e.g. user interface, video decode, PID filtering, etc.—ND 162 may be dedicated to performing streaming and networking functions to provide a natural path for adding network connectivity. In co-processor mode, ND 162 may provide both Network Interface Controller (NIC) functionality and Video Streaming Offload (VSO) functionality.

NIC functionality may include providing services expected of any network controller, such as receiving packets from the network and transmitting packets to the network, via Ethernet connectivity 186. This may allow SOC 160 to utilize ND 162 for low-bandwidth non-streaming network communication tasks as well, such as Web browsing, to complement DV 190 designs that include non-streaming networking capabilities. The NIC functionality of ND 162 may also provide a standard OS-specific interface on the level of a NIC driver, enabling existing DV 190 systems to use all their built-in higher-level network applications without requiring any changes.

VSO functionality may provide the ability to send/receive HD (high definition) video streams (or other types of video streams) over Ethernet 186, and direct those streams to/from TSI ports 180 and 182, thereby presenting DMS functionality to DMP 166 and/or DMP functionality to DMS 164, enabling DMS 164 and DMP 166 as network resources. In certain embodiments, VSO functionality may enable these streaming capabilities through the use of standard TSI ports (e.g. MPEG2 TSI ports), shown in FIG. 1 as TSI input port 180 and TSI output port 182, which are available on a majority of HD video SOCs. For example, HD streams received by ND 162 from DMS 164 over Ethernet 186 may be provided to SOC 160 via TS port 182. SOC 190 may decode the HD streams via decoder 176, and any video portion(s) of the streams may be displayed on HD display 156 via Video front-end circuit 174. In one set of embodiments, (not shown), streaming data received over Ethernet 186 may be routed by ND 162 to alternate and/or additional ports (other than TSI 180/182) that do not couple ND 162 to SOC 160, but couple ND 162 to other (alternative or additional) target devices, such as a digital media player or a display device capable of decoding the streaming data in accordance with the original target destination of the streaming data.

All streaming protocol and content protection processing may be performed inside ND 162 without involvement of SOC 160, enabling the VSO functionality to provide a seamless bridge between Ethernet 186 and TSI ports 180/ 182 on SOC 160. In one set of embodiments, command and control may be implemented on SOC 160 to tie the VSO functionality of ND 162 into the design and user interface of Host system 100. However, command and control functionality may also be jointly implemented on SOC 160 and ND 162, where ND 162 may function more autonomously from SOC 160. The manner in which ND 162 cooperates with SOC 160 during runtime may be determined based on the needs of Host system 100 to obtain optimum performance of Host system 100. NIC functionality and VSO functionality may be made available simultaneously (when in co-processor mode), allowing SOC 160 to have basic network access while offloaded streams are in progress.

It should also be noted that HS 100 in FIG. 1 is an exemplary system, and alternate embodiments may not comprise the exact components as illustrated in FIG. 1, and other possible components may not perform the exact same functions as the components shown in FIG. 1. In general, FIG. 1 is exemplary of a Host system (e.g. HS 100), in which a first interface (e.g. Host bus 184) and a second interface (e.g. TSI Input 180 and TSI output 182) may be configured on a network device (e.g. ND 162), with the network device also comprising a network interface interfacing to a given type of network (e.g. Ethernet 186). The network device may further be configured to interface with a Host processing unit (e.g. Main SOC 160) through the first and second interfaces, for exchanging data and for providing the Host processing unit connectivity to the network via the ND's network interface. In one set of embodiments, the network device and the Host processing unit may together be configured to enable data to be transmitted over the second interface simultaneously with the Host processing unit accessing the network via the first interface, and the network interface of the network device.

The Host processing unit and the network device may therefore each have the ability to receive/transmit data from/to the network as two distinct devices coupled to the network, and independently process the data received from the network even while both the network device and the Host processing unit have the same network address. In addition, the Host processing unit and the network device may each have the ability to receive/transmit data from/to the network, while simultaneously transferring data between each other over the second interface. In yet another set of embodiments, (not shown) tuner 158 may be coupled to ND 162 via TSI 180 (i.e. TSI 168 may be configured as coinciding with TSI 180 to couple tuner 158 to ND 162), and thus ND 162 may be configured to receive streaming data directly from Tuner 158, while still providing SOC 160 with network connectivity to Ethernet 186.

Figure 2:
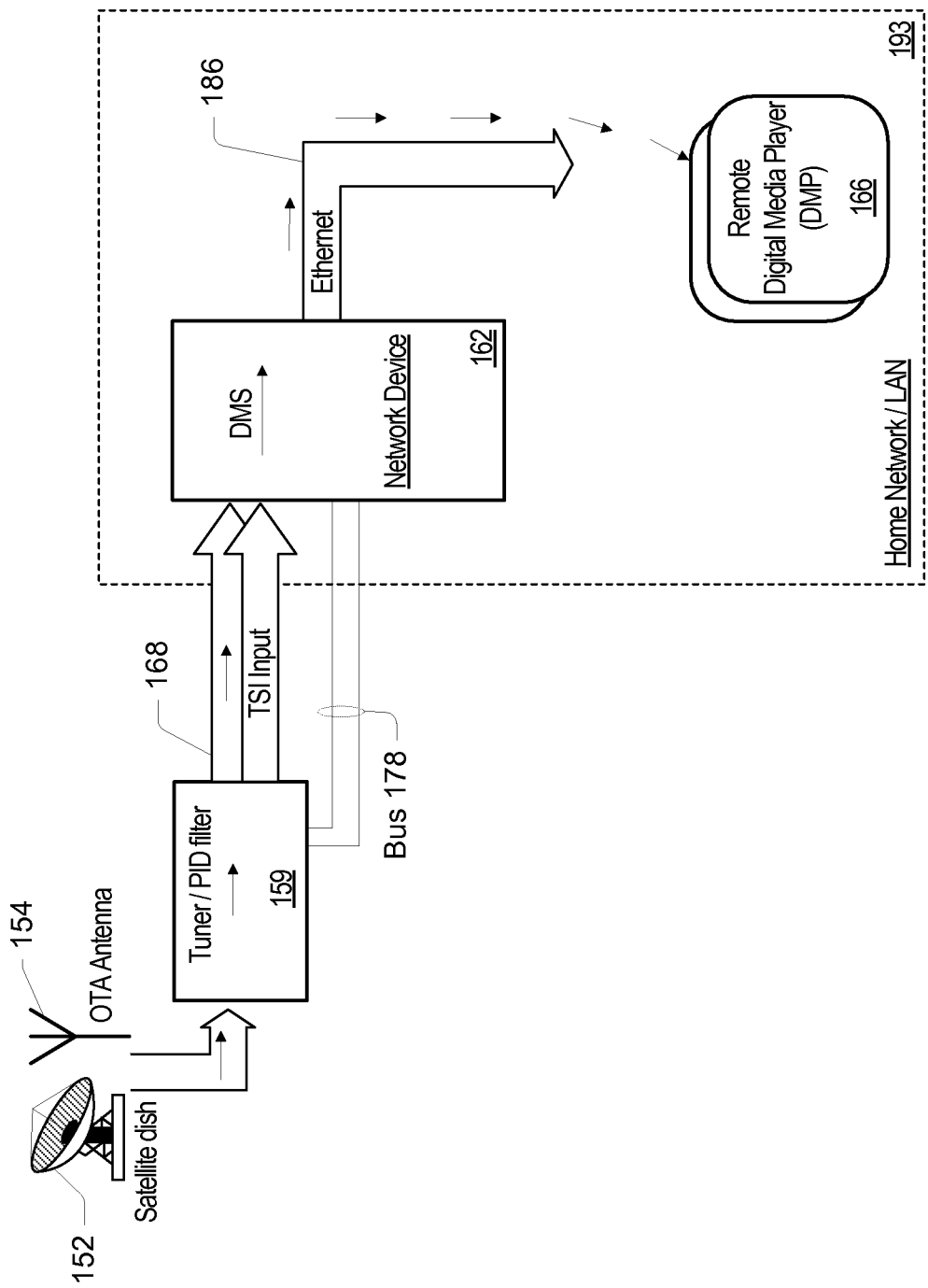
FIG. 2 shows the block diagram of a video/audio system configured with the ND operating in standalone mode without a Host CPU, according to one embodiment of the present invention.
Figure 3:
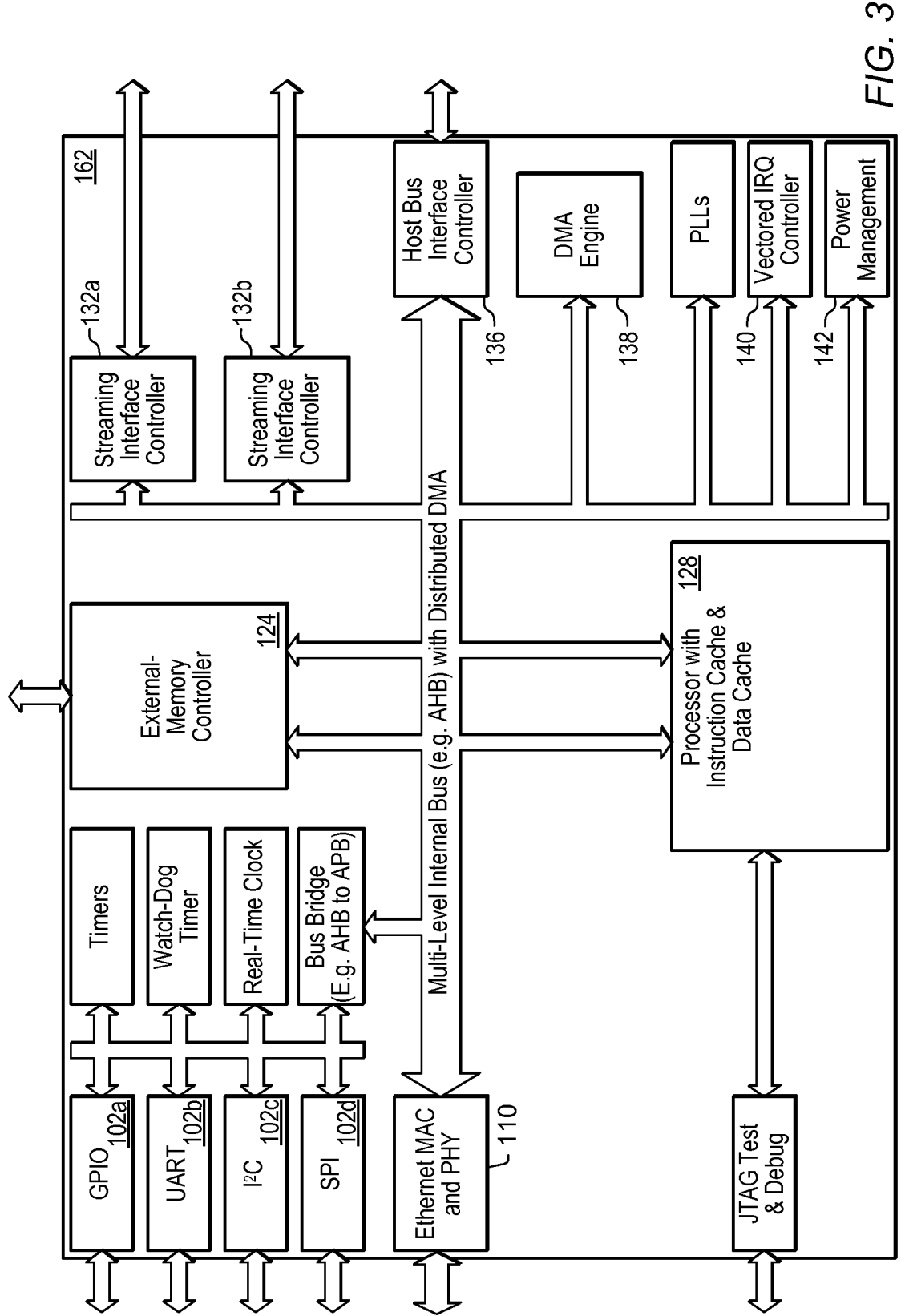
FIG. 3 shows the block diagram of one embodiment of the ND from FIGS. 1 and 2.

ND 162 may also be used in standalone mode, as illustrated in FIG. 2, in which ND 162 may be used as the primary processing means (or CPU) of the system. In standalone mode, there may be no connection to an external Host system. ND 162 may therefore operate as a system in itself, and may not rely upon commands received from a Host. Thus, there may be no need for IP Configuration upload, or adding custom ND 162 packet filtering rules, which may both be required for a dual network-stack architecture implemented in co-processor mode. In standalone mode, only the network stack of ND 162 may be used, and HTTP streaming may be handled differently than in co-processor mode. Local sources of video information, such as HD video tuner 159 with MPEG2 TSI ports, may therefore be used as network resources. ND 162 may operate to make tuner 159 appear on the network as a Digital Media Server. ND 162 may also control tuner 159 using a built-in bus interface 178, which may be an I²C interface in some embodiments.

Although FIG. 2 shows a DMS-only system, standalone mode may also enable use of a DMP with an external video decoder. In other words, ND 162 may make tuner 159 available as a network resource, such as a DMS, while also enabling interoperability with a DMP 166. In embodiments in which ND 162 does not perform PID filtering, a multi-program stream from tuner 159 may have to be filtered before entering ND 162. In standalone mode ND 162 may thus provide standalone Video Streaming (SVS) functionality, which, while similar to the VSO functionality available in co-processor mode, is designed to operate without Host SOC control. In addition, in standalone mode ND 162 may also run Web-based user interface for configuration and control.

In one set of embodiments, a Host system may be configured with ND 162 and SOC 160 to operate in a mix-mode, exhibiting some of the features of both standalone mode and co-processor mode. Referring again to FIG. 1, in mix-mode ND 162 may receive configuration information and commands from SOC 160 through Host Bus 184. However, in mix-mode, SOC 160 may operate without a network stack, and ND 162 may be configured such that it does not provide SOC 160 with a NIC function. SOC 160 may be configured to transmit streaming data to ND 162 over TSI 180, which ND 162 may transmit to the network via Ethernet interface/connectivity 186. Similarly, ND 162 may also be configured to receive streaming data from the network via Ethernet interface/connectivity 186, and transmit the streaming data to SOC 160 via TSI 182. Those skilled in the art will also recognize that having identified various operating aspects and characteristics of both SOC 160 and ND 162, various other modes of interoperation between SOC 160 and ND 162 are possible and are contemplated. For example, as previously noted, in addition to ND 162 transmitting streaming data received via Ethernet interface/connectivity 186 to SOC 160, ND 162 may also transmit the received streaming data and/or other data received via Ethernet interface/connectivity 186 to other targets that may be coupled to ND 162 via additional interfaces (not shown).

FIG. 3 shows the block diagram of one embodiment of ND 162 that may be configured to allow running at least two network stacks (e.g. TCP/IP stacks) synchronously on a single network (e.g. IP or Ethernet) interface. ND 162 may comprise a network interface, in this case an Ethernet interface 110, a processor 128, and streaming interface controllers 132*a* and 132*b* (collectively referred to as streaming interface controller 132). ND 162 may also be configured to interface with various buses through bus interfaces 102*a*-102*d*, and include a DMA (direct memory access) engine 138 and an external-memory controller 124 to reduce the involvement of processor 128 in memory transactions. Streaming interface controller 132 may be configured to provide sourcing and/or sinking of streaming data, and may include more than the two individual controllers shown. Furthermore, each controller of streaming interface controller 132 may be individually configured to sink or source data, thereby providing versatility in how data streams are routed and/or processed by ND 162. An internal bus 126 (e.g. an AHB—Advanced High-performance Bus—when processor 128 is an ARM processor) may be configured to couple together the internal components of ND 162. Communication with a Host may take place via a Host bus interface (HBI) controller 136, while built-in IRQ control and power management may be provided through modules 140 and 142, respectively. As previously mentioned, ND 162 may act as a stand-alone network processor with processor 128 operating as a Host DSP processor, or it may function in co-processor mode as a partial-offload processor for video traffic to an external Host processor.

Thus, ND 162 may be configured to bridge incoming or outgoing HD video streams between a network and streaming interface port(s), using Ethernet interface 110 and streaming interface controller 132. On the streaming interface port side, each port may be capable of either receiving (sinking) or transmitting (sourcing) data streams, and each may be configured to support a variety of streaming modes including but not limited to DVB/ATSC/ARIB SPI spec for MPEG2 TS streams, serial mode for MPEG2 TS streams, and extended parallel modes with flow control for non-TS content. In MPEG2 TS modes, only single-program MPEG2 TS streams may be supported. Multiple-program streams, such as those received from a satellite, may need to be PID-filtered before entering ND 162. On the network side, ND 162 may appear as a Digital Media Server (DMS) for local video streams going to the network, or as a Digital Media Player (DMP) for video streams available on the network.

The support for DMP and DMS may be divided into two distinct parts for each: the stream transport and the stream control. In certain embodiments, the stream transport may be represented by the HTTP 1.1 server and client, while the stream control may be represented by the UPnP A/V Media Server (UPnP MS) and UPnP A/V Media Renderer (UPnP MR). The stream control may run either on CPU 128 of ND 162, or on the Host CPU in SOC 160 to accommodate cases when the stream control is developed by a customer, or when the stream control is to be tightly integrated with other systems running on the Host CPU. In other embodiments, both transport and management portions may be running on ND 162. For example, in a system in which ND 162 is configured in a stand-alone mode, all streaming support software may run on CPU 128 of ND 162. The interface between the stream transport and the stream control may be defined as part of a designated application programming interface (referred to herein as NAPI) designed for ND 162, and its associated software, which will be discussed in further detail below. In general, referring back to FIG. 1, the VSO function may operate to provide a bridge between the TSI ports on Main SOC 160 or tuner 158, and the network (in this case Ethernet 186).

In one set of embodiments, software associated with ND 162 may be divided into two major categories. The first category may encompass all controller firmware modules designed to run on processor 128, and residing within ND 162. The controller firmware may be built to take advantage of the hardware capabilities of ND 162 to achieve high performance. The second category may encompass Host software comprising all software modules that reside on Host (DV) system 190 connected to ND 162 via HBI controller 136 and Host bus 184 (and possibly other and/or additional interfaces). The Host software may be architected and designed to provide a convenient and flexible API (application programming interface), allowing seamless integration of ND into the system. As previously mentioned, ND 162 may provide three main functions: NIC (network interface control), VSO (video streaming offload), and SVS (standalone video streaming), of which NIC and VSO are available in co-processor mode.

The NIC function of ND 162 may provide Host system 190 with network connectivity. Connectivity may be to one of a variety of different networks depending on the configuration and network requirements of the Host system (such as HS 100 in FIG. 1). The ND NIC function may be implemented in part by the network driver comprised in the ND Host software, and in part by a portion—referred to herein as NTC (Network Traffic Controller)—of the ND controller firmware. Overall, the NTC may comprise a special set of software modules devised to facilitate the offloading of data received through the network (such as Ethernet 186). It should be mentioned that although the ND NIC function may appear to the Host as a NIC driver (see also below), as used herein "ND NIC function" is a term that refers to the ND specific implementation of the functionality provided by the NIC driver.

Figure 4:
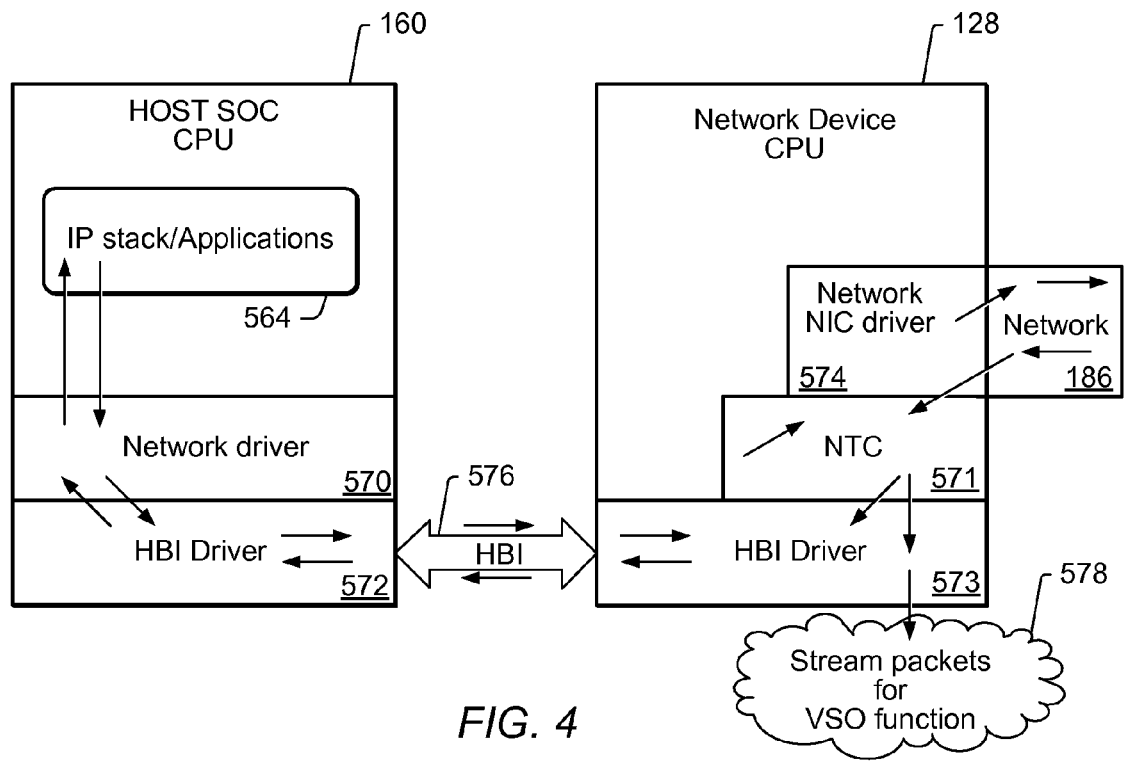
FIG. 4 shows a block diagram illustrating traffic management for the ND, according to one embodiment of the present invention.

FIG. 4 shows a diagram illustrating one embodiment of the ND NIC function. NTC 571 and network driver 570 may communicate via HBI 576 using the pair of HBI drivers 572 and 573, which may be part of both Host software and controller firmware, respectively, as shown. Network driver 570 may provide Layer 2 connectivity for the Host. It may use NTC 571 to send/receive packets to/from Ethernet 186. NTC module 571 may therefore be configured as a queuing layer for Host packets, and also as a filter for incoming packets not specifically intended for SOC 160, such as offloaded video streams 578. The ND NIC function may interact with the VSO function to control the sharing of the ND throughput resource, and to provide correct statistics for the ND NIC function. The ND NIC function may thus make offloaded video stream packets 578 invisible to SOC 160, so RX (receive), TX (transmit), dropped and other statistics may be adjusted accordingly. The ND NIC function may be engaged and may run simultaneously with the VSO function when the ND is operating in co-processor mode.

In one embodiment, running the ND NIC function simultaneously with the VSO function may be accomplished by having two network stacks sharing the same network address. In other words, the two network stacks may correspond to a single network address even though the two stacks are distinct from each other. For example, the ND NIC function may be configured to run two IP stacks corresponding to the same IP address. Furthermore, the two IP stacks may also share the same physical Ethernet interface (when an Ethernet interface is used to connect to the network) with the same MAC address. Thus, the ND NIC function may be used in ensuring that the IP stack corresponding to ND CPU 128 has a consistent status and does not interfere with the IP stack of SOC 160. In order to enable the VSO function, the Host may have to carry out additional configuration to enable filtering and to prevent TCP/UDP port conflicts.

In the co-processor mode, the VSO function may by default be inactive on the ND startup. It may be activated by the NIC configuration client application on the Host. Thus, the initial configuration of the VSO function may be performed through, or in concert with the NIC configuration application. It may expose the interface through the NAPI, which may be used by the Host application NIC configuration client. Both applications may allow the Host to apply IP configuration and basic filtering rules. Once the VSO function has been activated, the NTC module may begin filtering packets belonging to offloaded video streams, while the rest of the traffic may be directed to the Host as part of the NIC function.

The Host may be configured to carry out additional configuration using the NIC configuration client as part of enabling the VSO function. The additional configuration may include setting the ND dynamic TCP/UDP port range, which may be set different from the port range used by the Host IP stack in order to prevent the two IP stacks from opening two sockets with the same local port. IP configuration (e.g. address, mask, gateway) may configure the operation of the ND IP stack, allowing the NTC to begin filtering for packets belonging to the offloaded streams. In one set of embodiments, the filtering may be performed based on TCP/UDP port numbers, with each network stack having a range of port numbers assigned to them. By assigning respective port numbers, or respective ranges of port numbers to the different network stacks, multiple distinct network stacks all corresponding to the same network address may be implemented. Thus, alternate embodiments may feature more than two networks stacks (e.g. more than two IP stacks), with each network stack being assigned a port number or range of port numbers that do not overlap any of the port numbers corresponding to any of the other network stacks. The Host CPU may obtain this configuration by any means, be it DHCP, auto-IP, static configuration, etc. The NTC may also be programmed with rules for handling IP service protocols. Once the VSO and NIC functions have both been enabled, the Host may operate to ensure that it doesn't use listening sockets on the same ports as the ND HTTP server. When stream control runs on the ND CPU, NAPI calls made to the stream transport may be routed locally.

As previously mentioned, the ND software modules may be implemented as kernel modules and user-level applications. The ND firmware may therefore include operating system kernel patches, e.g. Linux kernel patches, to support the ND NIC function. That is, the NTC may provide basic Host network connectivity, (i.e. the NIC function), as a specialized kernel module that may be configured to separate Host communications and offloaded streams, allowing both the ND CPU(s) and the Host CPU(s) to have network connectivity using the same network address, and by extension, potentially the same physical MAC/PHY.

When the ND VSO and NIC functions are both in use, there may be a need to prioritize one function over the other, since both of them may compete for the ND throughput resources. The ND VSO function may thus be configured to have priority over the NIC function. This means that video streams may be handled as a priority task, while Host traffic may be handled using the remaining ND throughput capacity. Conversely, in order to guarantee at least a minimum performance level to the NIC function, the CPU usage of the ND VSO function may be capped at a configurable limit. In addition, the NIC function may also be adapted to prioritize data simultaneously received by the ND via both interfaces (i.e. the Host bus interface and the streaming interface). In such cases the NIC function may operate to arbitrate which of the data is given access to the network interface to be transmitted to the network. When IP configuration on the Host changes, the NIC configuration client application may be used to simultaneously update configuration on the ND CPU.

The NTC may itself be divided into three main parts by functionality: traffic management (TM), Ethernet driver configuration and synchronization (EC), and Pass-through (PT) mode. The TM modules may operate to aggregate (outgoing) and segregate (incoming) data traffic. As mentioned above, the EC modules may be configured to appear as one NIC function (driver) to the Host system. Therefore, the network (e.g. Ethernet) driver for the ND may be automatically configured based on the network (e.g. Ethernet) driver configuration(s) of the Host. In PT mode, contrasted with the offload mode, the data may be passed from the ND network driver directly to the Host network driver, without any processing performed on the data by the ND.

Traffic Management

Figure 5:
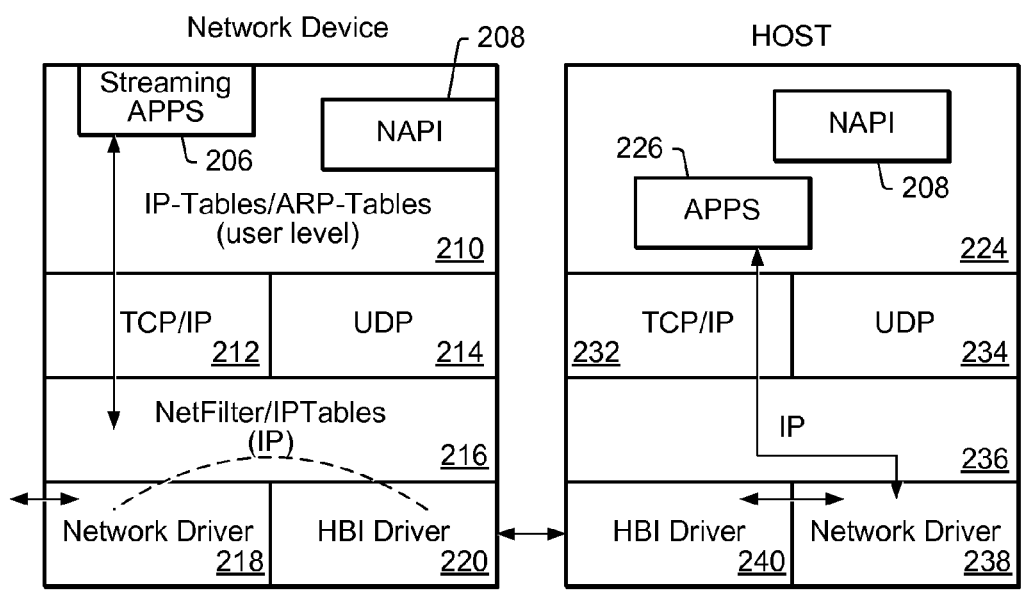
FIG. 5 shows a diagram illustrating an Ethernet driver configuration for the ND, according to one embodiment of the present invention.

In one set of embodiments, an existing operating system kernel, e.g. Linux Net-filter/firewall architecture may be extended to perform, in addition to its already existing filtering functions, data traffic filtering functions associated with the ND. Thus, it may be configured to perform the aggregation and segregation of the data traffic of the Host and the ND. FIG. 5 shows a block diagram illustrating one embodiment of data flow in context of the traffic management software structure for the ND. As shown, ND 162 and Host 160 may be configured with their own TCP/IP stacks (212 and 232, respectively). In one set of embodiments, the table rules may be set through NAPI module 208, which may be a separate module configured in application space, with respective modules configured on ND 162 and Host 160. The IP-Tables/ARP-Tables 210 may be designed as kernel and application modules, through which the filtering rules may be configured for performing filtering based on protocols and port numbers. Audio/Video streams, which may be received via the Ethernet connection involving Ethernet Driver 218 by ND 162 for streaming applications 206, may be filtered according to the filtering rules configured in IP-Tables/ARP-Tables 210. After filtering the incoming packets, another kernel module in the NTC may provide the data to the Host processor through the HBI interface, involving HBI Drivers 220 and 204, configured for ND 162 and Host 160, respectively. On the egress traffic, the NTC may read the data from the Host through HBI Driver 240, adjust the headers (if necessary), and send the data out, involving Ethernet Driver 218. The outgoing data traffic from ND 162 may not affect the outgoing traffic from the Host. ND 162 may be configured to operate according to one or more procedures aimed specifically at maintaining synchronization between the two TCP/IP stacks.

In order to maintain synchronization, the ICMP (Internet Control Message Protocol) and ARP (Address Resolution Protocol) packets may be transmitted to both IP stacks 212 and 232, but replies for the requests may be generated only from the ND. Replies that may be generated by the Host processor in response to these requests may be filtered out to eliminate duplicate replies. The rules may be set by the IP-Tables and ARP-Tables commands. Whether the incoming packets are sent to both IP stacks or only to the Host IP stack may be configured as a user accessible option. Furthermore, the IP IDs may be properly adjusted to ensure the possibility of reassembling any segmented IP packets. The ND and the Host processor may maintain separate IP ids. Finally, the ephemeral ports may be configured to avoid collision on the port assignments. This may be performed by adjusting the port ranges in the Linux kernel. For example, the ND may be assigned the smaller ephemeral port range [1024-4996] while the Host may be assigned a higher [40000-60000] port range.

Ethernet Driver Configuration

Figure 6:
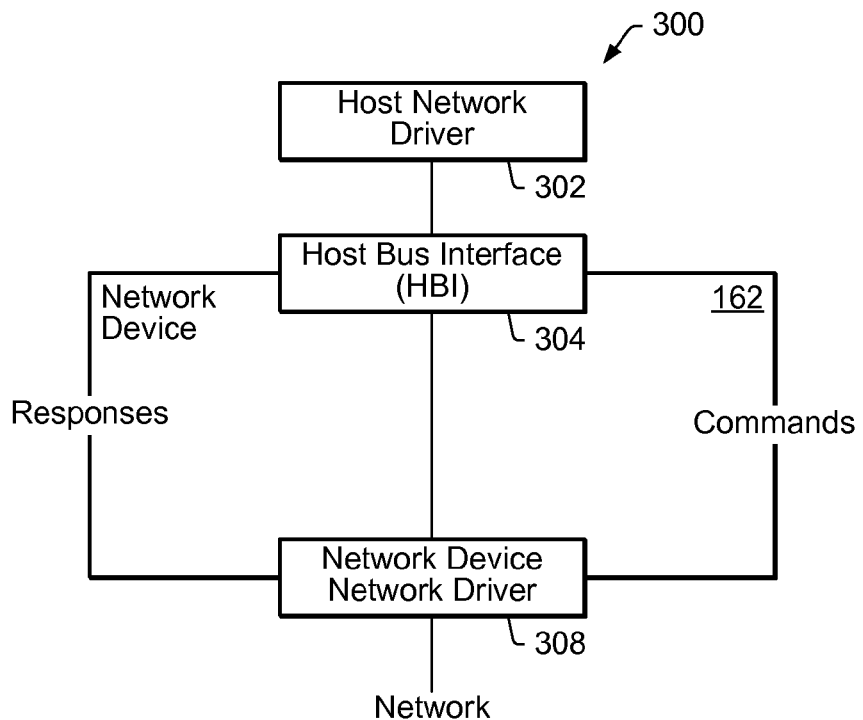
FIG. 6 shows a diagram illustrating a pass-through mode configuration for the ND, according to one embodiment of the present invention.

FIG. 6 shows one embodiment of how the ND network settings and Host network settings may be established in configuration mode. ND network driver 308 may be configured from Host network driver 302, through HBI 304. The user may set the configuration for Host network driver 302, and all the configurations may then be passed to ND network driver 308, which may be set accordingly. To facilitate this configuration, in one set of embodiments the communication channel and messaging commands may be developed through kernel pipe mechanisms. The following commands may be implemented for network (e.g. Ethernet) driver configuration.

1. Open: This command may be sent from the Host, and may facilitate opening the ND network driver 308 to enable transmit and receive functions. The Open command may also be used to assign a MAC address or get the MAC address if it was already assigned within the ND.

2. Close: This command may be sent from the Host to close ND Network Driver 308 to disable transmit and receive functions.

3. Ping: This command may be used by the Host to check if ND Network Driver 308 is alive. A live ND Network Driver would respond to a Ping command.

4. Set Rx Filter: This command may be used by the Host to configure multicast settings.

5. Get Statistics: The Host may use this command to retrieve packet and errors counters from the ND Network Driver 308.

6. Clear Statistics: The Host may use this command to clear the statistics counters within ND Network Driver 308.

7. Get Link Setting: The Host may use this command to retrieve the current link speed and duplex from ND Network Driver 308.

8. Set Link Mode: The Host may use this command to set the link speed and duplex in ND Network Driver 308.

Pass-Through Mode

Figure 7:
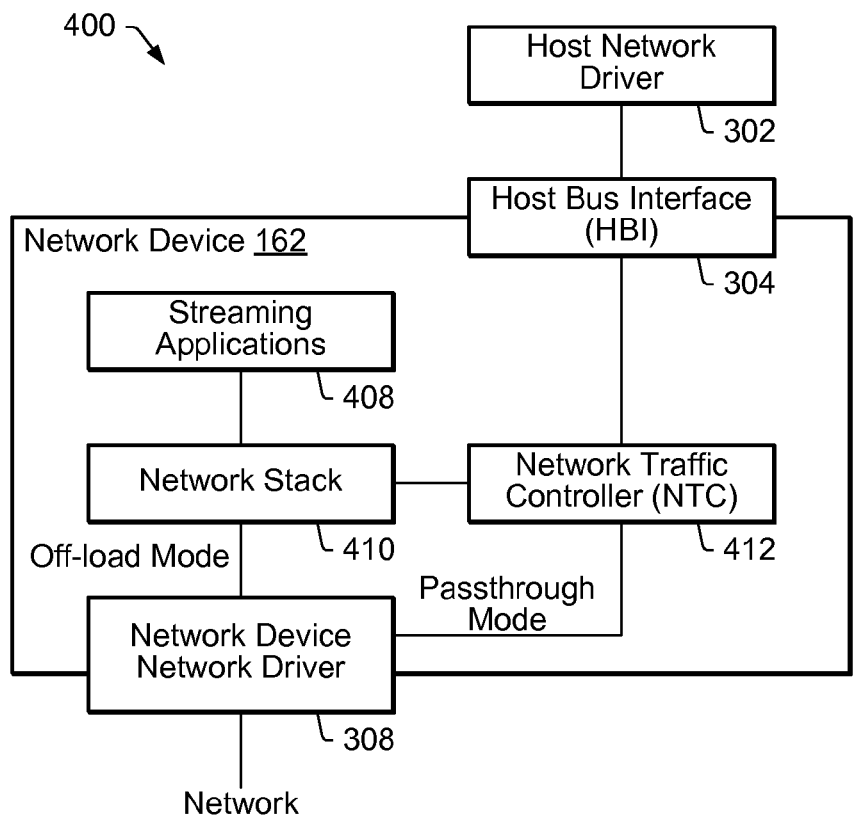
FIG. 7 shows a diagram illustrating a pass-through mode which may be designated as a special mode, according to one embodiment of the present invention.

Pass-Through (PT) mode may be designated as a special mode, illustrated in FIG. 7. With PT mode enabled, data may be passed directly from ND network Driver 308 to Host network Driver 302. A module in NTC 412 may receive the data from ND network Driver 308 and provide it to HBI interface 304. Similarly, data may be passed directly from HBI interface 304 to ND network Driver 308 through NTC 412. FIG. 7 also illustrates the path that data may take in the offload mode, involving network stack 410 of ND 162. In PT mode, the data may bypass network stack 410, thus not being operated on by any streaming applications 408 that may be configured to run on ND 162.

One example of when the Host system may be operated in PT mode is during boot up. When the Host boots up, it may need to acquire a network address (e.g. an IP address through DHCP—Dynamic Host Configuration Protocol), in which case ND 162 may operate as a simple network controller (e.g. simple Ethernet controller), passing all the data traffic to the Host. As a result, the Host may receive all the traffic, and obtain the network address (e.g. IP address) from the network. After the Host has performed address discovery, it may communicate the network address to the ND, and once the network address has been communicated to the ND, the ND may be taken out of PT mode and begin filtering incoming packets and/or data received from the network. PT mode may also be employed for de-bugging purposes.

One of the advantages of operating multiple TCP/IP stacks on a single Ethernet interface is the use of the same IP address and MAC address by all network stacks, enabling applications to run synchronously on two or more processors, in this case on a processor configured on the Host, and another processor configured on the ND, while simultaneously providing access to the network to at least one of those processors. In general, the Host processor may be configured to execute various control software routines, while the ND processor may be configured to execute a variety of data intensive code. For example, UPNP (Universal Plug and Play) applications may be loaded onto the Host, while streaming applications may be loaded on the ND, which may thereby be configured to receive the video data and process it. When operating in offload mode, an OS (operating system) kernel construct, e.g. a Linux firewall architecture, may be used to implement network traffic control, to remain agnostic to network frames. Filtering may be performed at any level such as at the IP address, protocol (TCP, UDP) and/or Port number levels. When filtering is performed at the kernel level, no data copying may be required as the same socket buffer may be used. Thus, the Host may be configured to operate in concert with the ND, using any one of a variety of commercial operating systems.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A method for routing and processing data packets in an operating system executed by a host processing unit co-operating with a co-processing unit, the method comprising:
   in a first operating mode coupling the host processing unit with the co-processing unit, and
     receiving network packets through a first network interface controller, wherein the first network interface controller provides a network interface and a network address and wherein the first network interface controller is the only network interface controller through which network packets are received;
     filtering the network packets according to first rules configured through at least one module embedded in a kernel of the operating system;
     based on said filtering, routing a first portion of data comprised in the network packets to a first network stack corresponding to the host processing unit;
     based on said filtering, routing a second portion of the data comprised in the network packets to a second network stack corresponding to the co-processing unit;
     wherein the first network stack and the second network stack share the network address and wherein the first network stack and the second network stack share the network interface;
   in a second operating mode, coupling the co-processing unit directly with a video device and receiving streaming data from the video device wherein the co-processing unit and video device are configured to operate as a digital media server without the host processing unit.

2. The method of claim 1, further comprising one or more of:
   the host processing unit processing the first portion of the data comprised in the network packets; and
   the co-processing unit processing the second portion of the data comprised in the network packets.

3. The method of claim 2, wherein said the co-processing unit processing the second portion of the data comprised in the network packets is performed concurrently with said routing the first portion of the data comprised in the network packets.

4. The method of claim 1, wherein the second portion of the data comprised in the network packets comprises one or more of:
   streaming video data;
   streaming audio data;
   streaming audio/video data; or
   image data.

5. The method of claim 1, further comprising one of:
   transmitting the routed second portion of the data comprised in the network packets to the host processing unit via a streaming interface; or
   writing the routed second portion of the data comprised in the network packets to a file system.

6. The method of claim 1, wherein said routing the first portion of the data comprised in the network packets comprises routing the first portion of the data comprised in the network packets via a host bus interface configured to interface the host processing unit with the co-processing unit.

7. The method of claim 1, further comprising configuring the first rules through:
   at least one module embedded in the kernel of the operating system; and
   at least one application module executed through the operating system.

8. The method of claim 1, further comprising one or more of:
   receiving outgoing data from the host processing unit and transmitting the outgoing data through the first network interface controller; and
   reading outgoing data from a file system and transmitting the outgoing data through the first network interface controller.

9. The method of claim 8, wherein said receiving the outgoing data from the host processing unit comprises one or more of:
   receiving at least a first portion of the outgoing data via a first interface; and
   receiving at least a second portion of the outgoing data via a second interface.

10. The method of claim 1, wherein the network packets comprise one or more of:
   ICMP (Internet Control Message Protocol) packets; and
   ARP (Address Resolution Protocol) packets;
   the method further comprising one or more of:
   when the network packets comprise ICMP packets, routing the ICMP packets to both the first network stack and the second network stack; and
   when the network packets comprise ARP packets, routing the ARP packets to both the first network stack and the second network stack.

11. The method of claim 10, further comprising one or more of:
   when the network packets comprise ICMP packets, the co-processing unit generating replies to requests comprised in the ICMP packets; and
   when the network packets comprise ARP packets, the co-processing unit generating replies to requests comprised in the ARP packets.

12. The method of claim 11, further comprising one or more of:
   when the network packets comprise ICMP packets, filtering out replies generated by the host processing unit in response to the requests comprised in the ICMP packets, to eliminate duplicate replies generated in response to the requests comprised in the ICMP packets; and
   when the network packets comprise ARP packets, filtering out replies generated by the host processing unit in response to the requests comprised in the ARP packets, to eliminate duplicate replies generated in response to the requests comprised in the ICMP packets.

13. A system comprising:
   a host device coupled with a video device configured to output streaming data;
   a network device for coupling the host device to a network, the network device comprising a first network interface controller interfacing the network device to a network through a network interface connection, wherein the first network interface controller provides a network interface and a network address through the network interface connection and wherein the first network interface controller is the only network interface controller through which network packets are received by the network device;
   wherein the network device comprises a host bus coupling the network device to the host device and being configured to transfer data between the host device and the network device;
   wherein the network device comprises a streaming data bus coupling the network device to the host device and being configured to transfer streaming data between the host device and the network device, wherein the streaming data bus is different from the host bus;
   wherein the network device is further configured to operate in a first mode in which the host device and the network device are configured to co-operate with each other to implement a network interface controller (NIC) function, wherein the NIC function provides the host device with network connectivity to the network via the host bus and the first network interface controller;
   wherein in implementing the NIC function, the host device is configured to use a first network stack, and the network device is configured to use a second network stack distinct from the first network stack; and
   wherein the first network stack and the second network stack share the network address and wherein the first network stack and the second network stack share the network interface; and
   wherein the network device is further configured to operate in a second mode in which the network device is coupled with said video device and receives output streaming data, wherein in the second mode the network device and video device operate as a digital media server.

14. The system of claim 13, wherein the network device is configured to transmit and receive streaming data to and from the host device via the streaming data bus simultaneously with the host device accessing the network through the host bus and the first network interface controller.

15. The system of claim 13, wherein the video device is a tuner device, the system further comprising;
   an additional streaming data bus coupled to the host device, wherein the tuner device is coupled to the additional streaming data bus, and configured to receive streaming information from a satellite, and transmit the streaming information to the host device over the additional streaming data bus.

16. The system of claim 13, wherein in implementing the NIC function, the network device operates according to a network device network driver and the host device operates according to a host device network driver;
   wherein the host device network driver is user configurable; and
   wherein the network device network driver is automatically configured based on a user configuration of the host device network driver.

* * * * *